COUPLED GOTO CIRCUITS INCLUDING AN INTERCONNECTED INDUCTOR

Filed Oct. 28, 1963 2 Sheets-Sheet 1

INVENTORS
JOHAN C. BALDER
EELTJE DE BOER
JAN TE WINKEL
BY

AGENT

INVENTORS
JOHAN C. BALDER
EELTJE DE BOER
JAN TE WINKEL
BY
Frank R. Trifari
AGENT.

United States Patent Office 3,258,610
Patented June 28, 1966

3,258,610
COUPLED GOTO CIRCUITS INCLUDING AN INTERCONNECTED INDUCTOR

Johan Cornelis Balder, Eeltje de Boer, and Jan te Winkel, Emmasingel, Eindhoven, Netherlands, assignors to North American Philips Company, Inc., New York, N.Y., a corporation of Delaware Filed Oct. 28, 1963, Ser. No. 319,261
Claims priority, application Netherlands, Oct. 29, 1962, 284,844
8 Claims. (Cl. 307—88.5)

This invention relates in general to modified Goto or "twin" circuits wherein a first pair of series-connected tunnel diodes whose unlike electrodes are connected to each other are fed in phase opposition by an alternating supply voltage and in which an induction is connected between the junction of the tunnel diodes and a point of constant potential.

Such circuits including an inductor are known and have the feature that the direction of the current passing through the inductor is maintained for a period of time after the supply voltage has fallen off wholly or partly. When the supply voltage re-attains a given value (i.e. with the next-following pulse if the supply voltage is pulsatory) said current will produce an output signal having a polarity opposite that of the initial output signal. Consequently, positive and negative signals are alternately available and the circuit may be considered a polarity inversion circuit. The condition for proper operation is, of course, that the time constant of the inductor with its own resistance or a resistor added thereto, should exceed the period of the supply voltage.

A primary object of the invention is to provide such an inversion circuit which can be suitable for use as a circuit element in a read amplifier or to perform majority logic.

According to one aspect of the invention, the junction of the tunnel diodes is connected to the junction of at least one further pair of similarly interconnected tunnel diodes, the further pair being fed in phase opposition by an alternating supply voltage having a frequency which is an even-numbered fraction, preferably one half, of the frequency of the alternating supply voltage fed to the first pair of tunnel diodes.

The above and further objects and features of the invention will be apparent and better understood from the following description thereof when taken in conjunction with the accompanying drawing, wherein.

Figure 1:
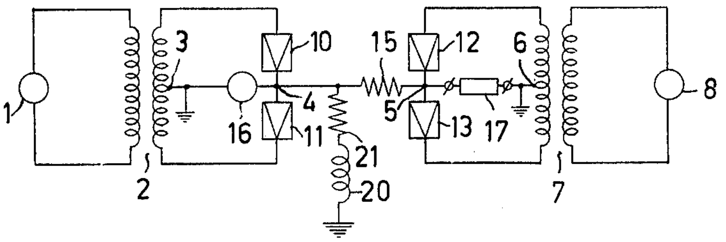
FIG. 1 shows an inversion circuit according to the invention, included in a circuit which operates as a read amplifier.

In the circuit arrangement shown in FIG. 1 the source 1 supplies a signal having the waveform of an alternating voltage, preferably a square wave, the signal being fed via the push-pull transformer 2, the secondary winding of which has a ground-connected center tap 3, to the series combination of tunnel diodes 10 and 11 which have their respective unlike electrodes connected together as shown. A control signal is fed to junction 4 from control-signal source 16.

A voltage is produced at the junction 4 of the tunnel diodes 10 and 11 which has the same polarity as the control-signal from the control-signal source 16. The voltage produced causes a current $i$ to flow through the coil 20. This current is maintained in the initial direction for some time owing to the inertia of the coil 20. The current $i$ flowing towards or away from the junction 4 determines the polarity of the next-following voltage pulse. Consequently, positive and negative voltage pulses occur alternately at the junction 4 as long as the control-current is lacking or as long as it is lower than $i$.

In accordance with the invention, the junction 4 is connected to the junction 5 of tunnel diodes 12 and 13, which also have their unlike electrodes connected together as shown and which are fed in phase opposition from the alternating-voltage source 8 via the push-pull transformer 7 whose secondary winding has a ground-connected center tap 6. Further in accordance with the invention the frequency of the signal from the source 8 is equal to half the frequency of the signal from the source 1.

Figure 2:
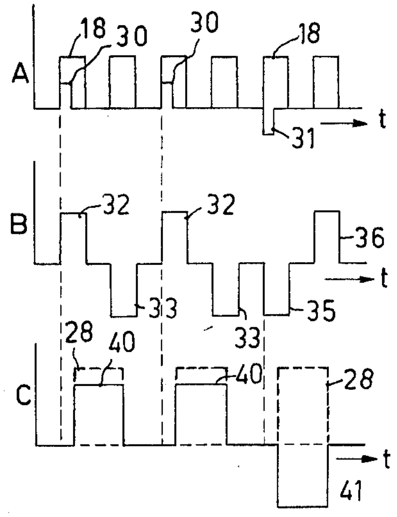
FIG. 2 shows waveforms illustrating the operation of the circuit of FIG. 1; in which signals having the waveform of an alternating voltage are plotted as a function of time.

The operation of the circuit of FIG. 1 will now be described with reference to FIG. 2.

Positive and negative control-pulses 30 and 31 respectively from the control-signal source 16 produce positive and negative signals 32 and 35 respectively at the junction 4, said pulses being followed, due to the inclusion of inductor 20 as stated above, by negative and positive pulses 33 and 36 respectively. The consecutive pulses will occur with the frequency of the pulses 18 from the voltage supply source 1. The voltage supply source 8 supplies pulses 28 (FIG. 2(C)) having a frequency equal to half the frequency of the pulses from the source 1. The pulses from source 8 preferably have a width larger than those from source 1, and they preferably do not start simultaneously with the latter. Although pulses 33 (FIG. 2(B)) are thus produced in the time interval in which the positive pulses 40 produced by pulses 32 appear at the load 17, pulses 40 will not be affected by pulses 33, since the magnitudes of signals 32 and 33 are small relative to the supply signals from the source 8.

If a negative control-pulse 31 is obtained from the control-signal source 16, there will be produced, in a manner similar to that in which the pulse 40 is produced, a pulse 41 which in turn can be read out.

This arrangement has the advantage that a comparatively small control signal 30 or 31, of short duration, enables a large signal 40 or 41 respectively of long duration to be read out.

The resistor 15, serves similarly to the time difference between the start of the supply signals from the sources 1 and 8, to decouple the two pairs of tunnel diodes as much as possible from each other. This time difference is preferably less than one third of a period of the supply voltage from the source 1.

It should be noted that the resistor 21, shown as a separate element in FIG. 1, may be constituted by the loss resistance of the coil 20.

To illustrate component values, in one embodiment diodes 10, 11, 12 and 13 were germanium tunnel diodes of an experimental type, having a peak current $I_p$ of 5 ma., a peak voltage $V_p$ of 50 mv., a valley current $I_D$ of 0.5 ma. and a valley voltage $V_D$ of 350 mv. The source 8 supplied pulses having a width of 5 nsec. and a repetition frequency of 100 mc./s.; the source 1 supplied pulses having a width of 2.5 nsec. and a repetition frequency of 200 mc./s. The resistors 15 and 21 had values of 200 ohms and 10 ohms respectively. The inductor 20 had a value of 0.1 $\mu$h. A control-pulse of 10 $\mu$a. from the control-signal source 16 permitted reading out signals of 200 mv.

Figure 3:
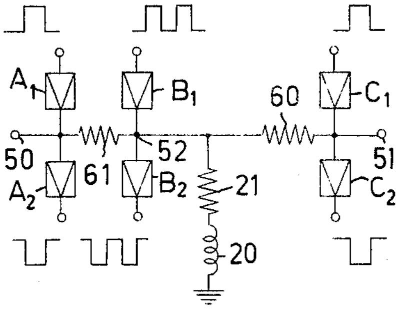
FIG. 3 shows an inversion circuit according to the invention, included in a circuit which operates as a majority logic element.

FIG. 3 shows three pairs of tunnel diodes $A_1$, $A_2$, $B_1$, $B_2$ and $C_1$, $C_2$. The tunnel diodes of each pair are connected to each other by their unlike electrodes. The supply voltages of the pairs $A_1$, $A_2$ and $C_1$, $C_2$ have a phase shift of 120° relative to each other, in order to avoid undesirable feedback from the output terminal 51 to the input terminal 50. For the sake of simplicity the pulsatory supply voltages of FIG. 3 are illustrated in the form of blocks near the non-connected electrodes of the tunnel diodes. These electrodes may of course be connected in any suitable manner, such as shown in FIG. 1. The duration of the supply pulses of pairs $A_1$, $A_2$ and $C_1$, $C_2$ are greater than those of the pairs $B_1$, $B_2$ and the frequency of the supply voltages of pairs $A_1$, $A_2$ and $C_1$, $C_2$ is half the frequency of the supply voltage of pair $B_1$, $B_2$.

Figure 4:
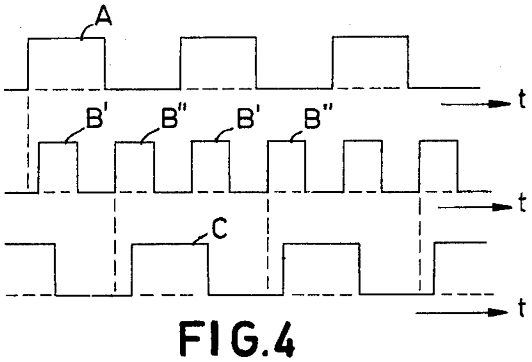
FIG. 4 shows waveforms illustrating the operation of the circuit of FIG. 3 in which signals having the waveform of alternating voltages are plotted as a function of time.

The duration of the pulses A and C of the supply voltages for pairs $A_1$, $A_2$ and $C_1$, $C_2$ respectively is the same and has such a value (FIG. 4) that the pulses A and the pulses B′ (for the pair $B_1$, $B_2$) coincide wholly or partly in time, while the pulses B″ (for the pair $B_1$, $B_2$) coincide partly in time with part of the pulses C.

The operation of the circuit of FIG. 3 is as follows. If a positive control-signal arrives at the input terminal 50, this will be passed, since the coincidence of the pulses B′ with part of the pulses A, via the pair $B_1$, $B_2$ to the series combination of the coil 20 and the resistor 21 between the junction 52 and earth potential. The coil 20 ensures that after the termination of the pulse B′ a negative current starts flowing towards the junction 52. Together with the supply pulse B″, this negative current supplies a small negative pulse to the junction of the tunnel diodes $C_1$ and $C_2$. Since the pulses C and B″ overlap each other, a great negative pulse is available at the output terminal 51.

The circuit shown in FIG. 3 may be included in a circuit for performing majority logic which has the feature that in the case of an odd number of input signals, the greater number of the same polarity determines the polarity of the output signal.

Figures 5, 6, 7:
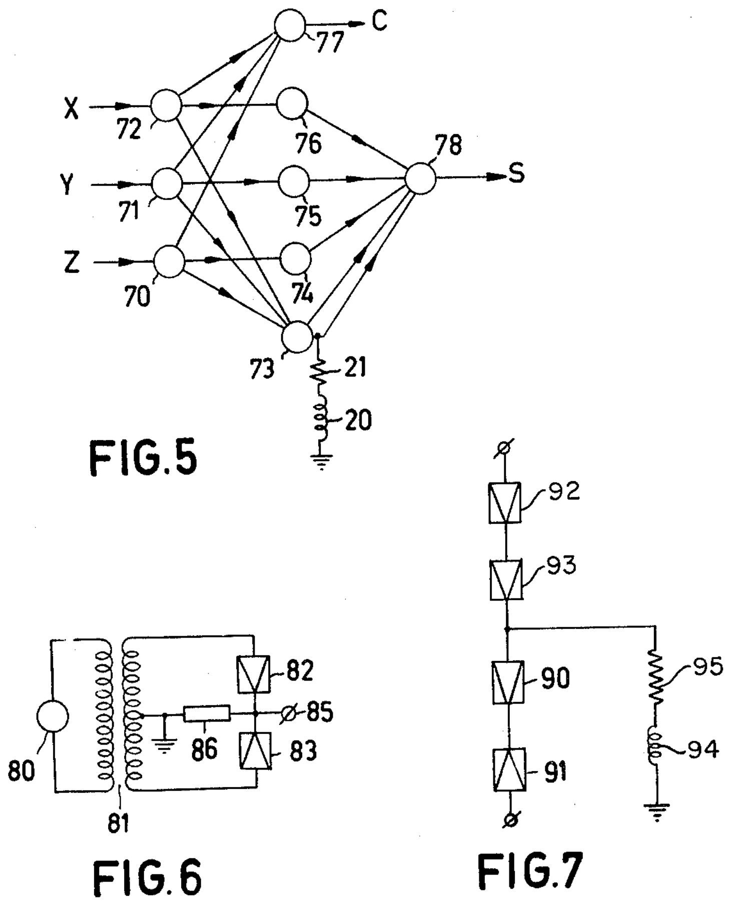
FIG. 5 shows another circuit for performing majority logic, in which a circuit element as shown in FIG. 3 is included.
FIG. 6 shows a circuit for obtaining a voltage having double the frequency of the applied voltage.
FIG. 7 is a modification of part of the circuit of FIGS. 1, 3 or 6.

FIG. 5 shows such a circuit for performing majority logic. Each pair of tunnel diodes is indicated for the sake of clarity by a circle. Pulses having the waveform A (FIG. 4) supply the pairs 70, 71 and 72, pulses having the waveform B′ and B″ supply the pairs 73 to 77, and the pair 78 is supplied by pulses having the waveform C. The series combination of the coil 20 and the resistor 21 at the junction of the pair of diodes 73 serves as noted above, to produce alternate polarity pulses.

The supply voltage required for the pairs 10, 11 (FIG. 1) $B_1$, $B_2$ (FIG. 3) and 73 to 77 (FIG. 5), which is twice the frequency supplied to the other pairs of tunnel diodes in the respective figures, may be obtained, for example, with the aid of the arrangement shown in FIG. 6. If an alternating voltage from source 80 is fed via the push-pull transformer 81 in phase opposition to the series combination of the tunnel diodes 82 and 83, which are connected to each other by their like electrodes, an alternating voltage having double the frequency of the signal of the source 80, can be derived from the resistor 86 connected between the junction 85 and ground potential.

The same result is obtained, when each of the diodes 82, 83 is replaced by the series combination of two tunnel diodes which are connected to each other by their like electrodes. The resulting combination comprises four tunnel diodes 90, 91, 92 and 93, as shown in FIG. 7. If the resistor 86 is replaced in this arrangement by an inductor or the series combination of an inductor 94 and a resistor 95 (equivalent to inductor 20 and resistor 21) then both a frequency doubling and an alternate appearance of positive and negative pulses are obtained. For frequency doubling purposes, then, the series combination of tunnel diodes 90, 91, 92 and 93 replaces both of the diodes 10 and 11 (FIG. 1), $B_1$, $B_2$ (FIG. 3) or 73 to 77 (FIG. 5).

While the invention has been described with respect to specific embodiments, modifications and variations thereof will be readily apparent to those skilled in the art without departing from the inventive concept, which is set forth in the appended claims.

What is claimed is:

1. A circuit comprising: first and second tunnel diodes connected in series with their unlike electrodes connected together at a first junction, means for feeding a first alternating voltage in phase opposition to the series combination of said first and second diodes, an inductor connected between said first junction and a point of constant potential, said first junction being connected to the junction of a further pair of series-connected tunnel diodes, the unlike electrodes of said further pair being connected to each other, and means for feeding an additional alternating voltage in phase opposition to said further pair, said additional alternating voltage having a frequency which is a multiple of the frequency of said first alternating voltage.

2. A circuit as recited in claim 1, wherein said first and second alternating voltages start at different times, the difference between said starting times differing from each other less than one-third of the period of the first alternating voltage.

3. A circuit comprising: first and second tunnel diodes connected in series with their unlike electrodes connected together at a first junction, means for feeding a first alternating voltage in phase opposition to the series combination of said first and second diodes, an inductor connected between said first junction and a point of constant potential, said first junction being connected to the junction of a plurality of further pairs of series-connected tunnel diodes, the unlike electrodes of each further pair being connected to each other, and means for feeding an additional alternating voltage in phase opposition to each further pair, each additional alternating voltage having a frequency which is a multiple of the frequency of said first alternating voltage.

4. A circuit as recited in claim 3, wherein each of said alternating voltages start at different times, the difference between said starting times differing from each other less than one-third of the period of the first alternating voltage.

5. A circuit as recited in claim 4, wherein the starting times are such that there is a phase shift of 120° between said additional alternating voltages.

6. A circuit comprising: first and second tunnel diodes connected in series with their unlike electrodes connected together at a first junction, means for feeding a first alternected between said first junction and a point of constant tion of said first and second diodes, an inductor connected between said first junction and a point of constant potential, said first junction being connected to the junction of a plurality of further pairs of series-connected tunnel diodes, the unlike electrodes of each further pair being connected to each other, and means for feeding an additional alternating voltage in phase opposition to each further pair, each additional alternating voltage having a frequency which is a multiple of the frequency of said first alternating voltage, each of said alternating voltages starting at different times, the differences between said starting times differing from each other less than one-third of the period of the first alternating voltage, the source for each additional alternating voltage being constituted by the series combination of two tunnel diodes having their like electrodes connected together and being fed in phase opposition by a supply voltage, the additional alternating voltage being taken from the junction point of said like electrodes.

7. A circuit comprising: first and second tunnel diodes connected in series with their unlike electrodes connected together at a first junction, means for feeding a first alternating voltage in phase opposition to the series combination of said first and second diodes, an inductor connected between said first junction and a point of constant potential, said first junction being connected to the junction of a plurality of further pairs of series-connected tunnel diodes, the unlike electrodes of each further pair being connected to each other, each diode of every pair of said further pairs having connected to it an additional diode, said each diode and additional diode being connected by their like electrodes, means for feeding a supply voltage in phase opposition to each combination of said further pairs of diodes and additional diodes for applying to each further pairs an additional alternating voltage having a frequency which is a multiple of the frequency of said first alternating voltage.

8. A circuit as recited in claim 7, each of said alternating voltages starting at different times, the differences between said starting times differing from each other less than one-third of the period of the first alternating voltage.

References Cited by the Examiner

G. E. Tunnel Diode Manual, pages 60–65, March 1961.

"Application of Tunnel Diodes in Switching Circuits," University of Illinois Graduate College Digital Computer Lab. Report #102, Kunihiro, pages 54 and 55, October 1960.

"Tunnel Diode Logic Circuits," Electronics, Chow, pages 103–107, June 1960.

ARTHUR GAUSS, *Primary Examiner.*

S. D. MILLER, *Assistant Examiner.*